United States Patent [19]  [11] 3,872,098
Jones et al.  [45] Mar. 18, 1975

[54] 1,N⁶-ETHENOADENOSINE CYCLOPHOSPHATE COMPOUNDS

[75] Inventors: Gordon H. Jones, Cupertino; John G. Moffatt, Los Altos, both of Calif.

[73] Assignee: Syntex (U.S.A.) Inc., Palo Alto, Calif.

[22] Filed: July 11, 1973

[21] Appl. No.: 378,220

Related U.S. Application Data

[63] Continuation-in-part of Ser. No. 295,889, Oct. 10, 1972, abandoned.

[52] U.S. Cl. ................... 260/211.5 R, 424/180
[51] Int. Cl. ............................. C07d 51/54
[58] Field of Search ................. 260/211.5 R

[56] References Cited
UNITED STATES PATENTS

| | | | |
|---|---|---|---|
| 3,558,595 | 1/1971 | Jones et al. | 260/211.5 R |
| 3,712,885 | 1/1973 | Weimann et al. | 260/211.5 R |

Primary Examiner—Johnnie R. Brown
Attorney, Agent, or Firm—William B. Walker

[57] ABSTRACT

New ethenoadenosine cyclicphosphate compounds are disclosed wherein the 1,N⁶ nitrogen atoms of the adenosine moiety bear an etheno or substituted etheno bridge group. Also disclosed are methods for the preparation of these compounds, which are useful as intracellular mediators of hormone effect in animals. 1,N⁶-etheno-8-benzylthioadenosine 3',5'-cyclicphosphate, 1,N⁶-α-propylethenoadenosine 3',5'-cyclicphosphate, the 3'-cyclic ester of 1,N⁶-etheno-5'-deoxy-5'-dihydroxyphosphinylmethyladenosine, the 5'-cyclic ester of 1,N⁶-etheno-3'-deoxy-3'-dihydroxyphosphinylmethyladenosine, 1, N⁶-etheno-9-(6-deoxy-β-D-allofuranosyl)adenine 3',5'-cyclicphosphate, 1, N⁶-etheno-9-(6-deoxy-α-L-talofuranosyl)-adenine 3',5'-cyclicphosphate, and 1, N⁶-etheno-5',5'-di-C-methyladenosine 3',5'-cyclicphosphate are illustrated as representative of the compound class.

21 Claims, No Drawings

1,N⁶-ETHENOADENOSINE CYCLOPHOSPHATE COMPOUNDS

This is a continuation-in-part of application Ser. No. 295,889, filed Oct 10, 1972, and now abandoned.

The present invention relates to the chemistry of nucleotides and, more particularly, is directed to new 1,N⁶-ethenoadenosine 3′, 5′-cyclicphosphate compounds. The present invention is further directed to methods for the preparation of these compounds, certain intermediates useful therein, and the use of the product 1,N⁶-ethenoadenosine 3′,5′-cyclicphosphate compounds in the treatment of various metabolic disorders by intracellular mediation of hormones considered responsible for physiological responses in various tissues.

Adenosine 3′,5′-cyclicphosphate (CAMP), present in almost all types of mammalian tissue and synthesized in the cell, controls some of the physiological and metabolic effects associated with the cell type and attributed to specific regulatory hormones. The sequence of events involved, seen with most of the hormones examined, namely, interaction of the primary hormone with the cell membrane resulting in increased synthesis of CAMP, which mediates the functions of the hormone, have led to the designation of CAMP as a second messenger. Evidence has accumulated to indicate that several diseases including metabolic and endocrine disorders are probably due to insufficient concentrations of CAMP in the cell. Thus, a rational approach in the treatment of such disease states depends upon elevating CAMP levels in the specific cell types afflicted. This can be achieved by the direct administration of CAMP. However, this approach suffers from the disadvantages of its poor permeability through the cell membrane and its apparent lack of tissue selectivity to its action.

The present invention is directed to a new series of 1,N⁶-ethenoadenosine 3′,5′-cyclicphosphate compounds which combine the advantage of high biological activity with increased selectivity in action to different target tissues and increased stability toward degenerative enzymes. In addition, these compounds are highly fluorescent and hence are of considerable interest in biochemical studies, e.g., on the mode of action of adenosine 3′,5′-cyclicphosphate. The compounds of the present invention are represented by the following formula:

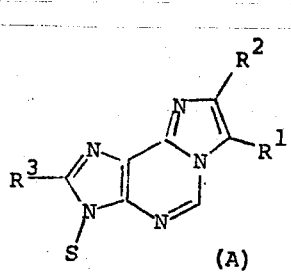

wherein one of $R^1$ and $R^2$ is hydrogen and the other of $R^1$ and $R^2$ is hydrogen, alkyl of from 1 to 10 carbon atoms, phenyl, substituted phenyl, or 2-naphthyl;

$R^3$ is hydrogen, halo, hydroxy, alkoxy, aryloxy, aralkoxy, sulfhydryl, alkylthio, arylthio, aralkylthio, azido, amino, acylamino, alkylamino, aralkylamino, dialkylamino, or diaralkylamino; and S is a sugar moiety selected from the group consisting of:

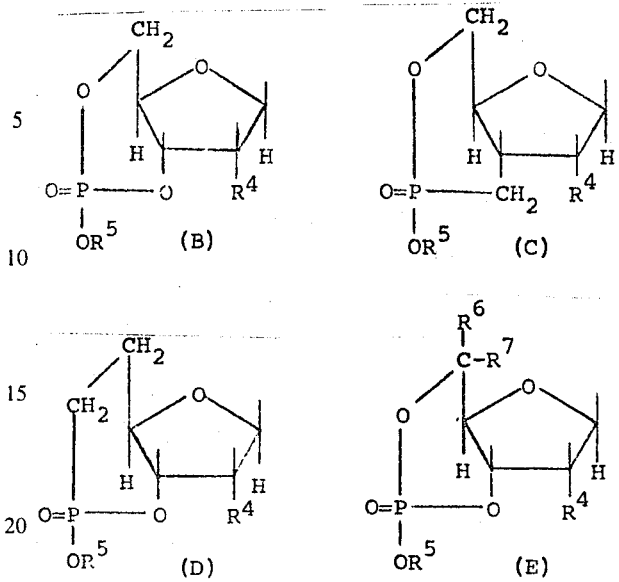

wherein, in each applicable formula, $R^4$ is hydroxy or a conventional group convertible to hydroxy by hydrolysis;

$R^5$ is hydrogen or a pharmaceutically acceptable cation; and one of $R^6$ and $R^7$ is hydrogen and the other of $R^6$ and $R^7$ is a lower alkyl group or $R^6$ and $R^7$ are identical lower alkyl groups.

Preferred groups of compounds of those represented above are those wherein, when each of $R^1$ and $R^2$ is hydrogen and S is a sugar moiety of Formula (B) in which $R^4$ is hydroxy, then $R^3$ is other than hydrogen or those wherein, when S is a sugar moiety of Formula (B) in which $R^4$ is hydroxy and $R^3$ is hydrogen, then one of $R^1$ and $R^2$ is other than hydrogen.

Other preferred compounds hereof are those represented above wherein one of $R^1$ and $R^2$ (preferably $R^1$) is propyl or phenyl and those thereof wherein $R^3$ is methylthio or benzylthio and those thereof wherein S is a sugar moiety of Formulas (C) or (D) in which $R^4$ is hydroxy or (E) in which $R^4$ is hydroxy and one or both of $R^6$ and $R^7$ is methyl.

The compounds of the present invention are represented structurally as free bases but, when isolated under the conditions described herein, probably exist as zwitter ions which can be represented by the following partial formula:

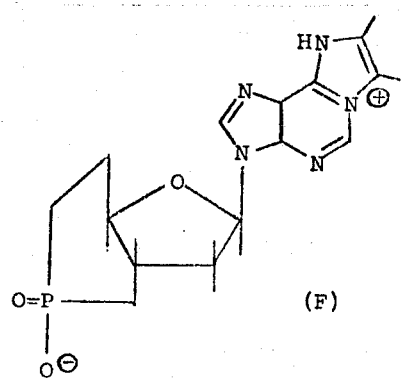

The compounds of the present invention are useful in the treatment of various disease states, including metabolic and endocrine disorders, by virtue of their ability to increase the levels of intracellular mediators of hormone effect. They demonstrate high biological activity and selectivity in action to different target tissues. They also show stability towards degenerative enzymes, i.e., cyclicphosphodiesterase. Thus, the compounds of the present invention are useful, for example, in the treatment of bronchial asthma, refractory congestive heart failure, diabetes mellitus, pseudohypoparathyroidism, obesity, some neoplastic manifestations, vasopressin resistant diabetes insipidus, and other disorders attributable to pituitary disfunction.

The present invention, in a second aspect, is directed to pharmaceutical compositions incorporating a compound of Formula (A) hereof as an essential active component in admixture with a pharmaceutically acceptable non-toxic carrier.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium stearate, sodium stearate, glycerol monostearate, sodium chloride, dried skim milk, glycerol, propylene glycol, water and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The present invention also involves a method useful for the treatment of biological disorders which comprises administering an effective amount of a compound of Formula (A) hereof.

An amount of a compound hereof effective for the treatment of biological disorders, in accordance herewith, can vary generally in the range of from about 1 mg. to about 100 mg. per kg. of host body weight administered one or more times daily. The active compound hereof can be administered in any suitable manner, parenteral or oral, and in any form suitable for the administration mode, isotonic solutions, suspensions, tablets, capsules, and the like.

The present invention, in a further aspect, is directed to methods for the preparation of the compounds (Formula A) hereof and to intermediates useful therein. The compounds of the present invention can be prepared in accordance with the following reaction equation:

wherein each of $R^1$, $R^2$, $R^3$ and S is as above defined, $R^3$ being preferably hydrogen.

With reference to the above reaction, a starting adenosine compound (1) is reacted with a compound selected from those represented by the following formulas:

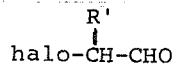

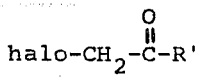

(2)　　　　　　　　　　　　(3)

wherein each R' is hydrogen, alkyl of from 1 to 10 carbon atoms, phenyl, substituted phenyl, or 2-naphthyl; and each halo is bromo, chloro, or iodo, preferably bromo or chloro.

Although not intending to be restricted to the precise mechanism of reaction, the foregoing reaction is believed to operate with alkylation at the 1 position followed by ring closure at the $N^6$ position thus providing, with use of aldehyde (2), the α-substituted (R'=other than hydrogen) etheno compounds and, with use of ketone (3), the β-substituted (R'=other than hydrogen) etheno compounds, the α carbon of the etheno bridge being that directly linked to $N^1$ of the adenine ring, as depicted above.

The above reaction is conducted at temperatures ranging from about 25° to about 75°C and for a period of time ranging from about 12 hours to about 150 hours, preferably employing from about 1 to 20 moles of reagent (2) or (3) per mole of starting substrate (1). The reaction is further preferably conducted in an aqueous solution buffered at about pH 5 by the addition of appropriate buffers such as 0.1 to 0.5M sodium acetate, sodium 2-morpholinoethane sulfonate, and the like. Where necessary in order to obtain homogeneous solutions, co-solvents such as dimethylformamide, hexamethylphosphorictriamide and dimethylsulfoxide can be added. See Secrist et al., Science 177, 279 (1972) and the references footnoted therein.

The starting compounds represented above by Formula (1) above are known compounds and/or can be prepared by methods known per se. See Montgomery et al., Advances in Carbohydrate Chemistry 17, 310 (1962) and Dekker et al., The carbohydrates, Chemistry and Biochemistry, Pigman and Horton Eds. (1970) for the starting compounds of Formula (1) wherein S is Formula (B). The starting compounds represented by Formula (1) wherein S is Formula (C) are described, for example, in U.S. Patent 3,558,595 to Jones et al. The starting compounds represented by Formula (1) wherein S is Formula (D) are described, for example, in U.S. Pat. No. 3,446,793 to Jones et al.

Those starting compounds represented by Formula (1) wherein S is Formula (C) or (D) wherein $R^3$ is other than hydrogen are novel. They are useful as starting compounds as herein described and also useful as intracellular mediators of hormone effects as described

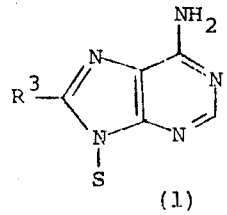

herein. This class of novel compounds are represented as follows by Formulas (G) and (H).

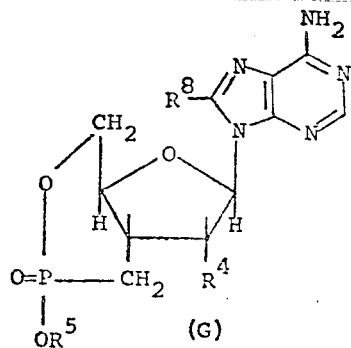

(G)

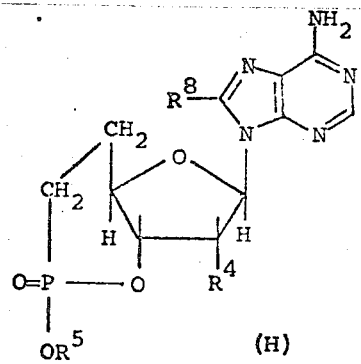

(H)

wherein each of $R^4$ and $R^5$ is as above defined and $R^8$ is $R^3$ exclusive of hydrogen.

The starting compounds represented by Formula (1) wherein S is Formula (E) are described, for example, in U.S. Pat. application Ser. No. 294,777, filed on Oct. 10, 1972, to Jones, Ranganathan, and Moffatt, which is hereby incorporated by reference. Briefly, one such method for preparing the latter as described in said patent application involves protecting adenosine by conventional introductions of the 2',3'-O-isopropylidene grouping and the $N^6$-acyl grouping followed by reacting the protected product under oxidative conditions with dicyclohexylcarbodiimide and dimethylsulfoxide in the presence of dichloroacetic acid and purification of the product thereof via the 5'-imidazolidine derivative to give the corresponding 5'-aldehyde hydrate. The thus-prepared aldehyde is alkylated with alkyl magnesium chloride to give the corresponding 5'-alkyl-β-D-allo (Formula 1; S=E wherein $R^6$=alkyl and $R^7$=H) and 5-alkyl-α-L-talo (Formula 1; S=E wherein $R^6$=H and $R^7$=alkyl) compounds which can be separated and isolated, if desired, by chromatography. The resultant compounds or a mixture thereof are oxidized to the ketone by reaction with a suitable oxidizing agent such as dicyclohexylcarbodiimide and dimethylsulfoxide and the resultant ketone alkylated with alkyl magnesium chloride to give the corresponding 5',5'-di-C-alkyl (Formula 1; S=E wherein $R^6$=$R^7$=alkyl) compounds. The 5'-alkyl and 5',5'-di-C-alkyl compounds are then phosphorylated at C-5' using bistrichloroethylphosphorochloridate and the thus-produced product is hydrolyzed under conditions known per se to produce the corresponding 2',3'-dihydroxy compound. This compound when treated with zinc dust in the presence of acetic acid produces the dihydroxy 5'-O phosphate ester or salt thereof which, when treated with base such as ammonium hydroxide, is hydrolyzed to the corresponding compound in which the base is no longer protected. This product is then cyclized to the 3',5'-cyclicphosphate compound.

The starting compounds represented by Formula (1) are converted, if necessary, to the starting compounds of Formula (1) containing, in addition, the various substituents represented by groups $R^3$, $R^4$, and $R^5$ by methods known generally in the art. Alternatively, these groups can be introduced on the otherwise substituted products (A).

Thus, reaction of the compounds of Formula (1) with bromine in aqueous sodium acetate buffer pH 3.9, as described by Muneyama et al., Biochemistry, 10, 2390 (1971), gives the corresponding 8-bromo compounds which are isolated by conventional techniques such as crystallization or ion exchange chromatography on diethylaminoethylsephadex (DEAE-sephadex). Other $R^3$ substituents are introduced via nucleophilic substitution reactions using various nucleophiles and the 8-bromo compounds thus prepared. For example, reaction of the 8-bromo compound with alkylthiols, arylthiols and aralkylthiols in the presence of sodium methoxide leads to the 8-alkylthio, 8-arylthio, and 8-aralkylthio compounds, respectively; reaction thereof with sodium hydroxide or with sodium alkoxides, aryloxides, or aralkyloxides gives the 8-hydroxy, 8-alkoxy, 8-aryloxy, and 8-aralkoxy compounds, respectively; reaction thereof with thiourea gives the 8-sulfhydryl compounds; reaction thereof with alkylamines, dialkylamines, aralkylamines and diaralkylamines gives the 8-alkylamino, 8-dialkylamino, 8-aralkylamino and 8-diaralkylamino compounds, respectively; reaction thereof with azide ion gives the 8-azide compounds, which are reduced catalytically to the 8-amino compounds, which can be converted to the 8-acylamino compounds by reaction with an acyl chloride or an acid anhydride as described elsewhere. The 8-chloro and the 8-iodo compounds are prepared from the 8-methylthio or the 8-thio compounds by reaction with chlorine and hydrochloric acid at −10° to −20°C or with iodine and sodium iodide, see Gersen et al., J. Org. Chem. 28, 945 (1963). The 8-fluoro compounds are prepared via diazotization of the 8-amino compounds, in the presence of fluoroboric acid followed by either irradiation with ultra violet light or heating of the intermediate diazonium tetrafluoroborate.

The elaborative groupings represented by $R^4$ can be prepared by reacting the compounds of Formula (1) wherein $R^4$ is hydroxy with the desired corresponding organic acid anhydride of a carboxylic acid having from 1 to 22 carbons in a suitable inert organic solvent such as pyridine, for example, by reacting it with acetic anhydride in pyridine or preferably with butyric anhydride in pyridine solution. Tetrahydropyran-2-yl, tetrahydrofuran-2-yl, and 4-methoxytetrahydropyran-4-yl ethers can be prepared by well known, conventional procedures from the corresponding respective dihydropyran, dihydrofuran, and 4-methoxy-5,6-dihydro-2H-pyran in a suitable inert organic solvent such as dimethylformamide, dioxane, or tetrahydrofuran in the presence of a suitable catalyst such as p-toluenesulfonic acid.

Salts with pharmaceutically acceptable cations (when $R^5$ is a pharmaceutically acceptable cation) can be conventionally prepared by cation exchange from another salt or by neutralization with a specific base followed by precipitation.

The phrase "conventional groups convertible to hydroxy by hydrolysis" refers to conventional groups which can be hydrolyzed to hydroxy groups such as, for example, conventional hydrolyzable ester groups and hydrolyzable ether groups. The term "hydrolyzable ester groups", as used herein, refer to those esters and acyl derivatives conventionally employed in the nucleoside and nucleotide art, preferably those derived from carboxylic acids of 1 to 22 carbon atoms. Typical conventional hydrolyzable acyl groups thus include acetoxy, propionyloxy, butyryloxy, valeryloxy, isovaleryloxy, hexanoyloxy, heptanoyloxy, octanoyloxy, nonanoyloxy, undecanoyloxy, lauroyloxy, benzoyloxy, phenylacetoxy, palmitoyloxy, phenylpropionyloxy, p-tolyloxy, β-cyclopentylpropionyloxy, and the like. The term "hydrolyzable ether groups", as used herein, denotes those hydrolyzable groups conventionally employed in the nucleoside and nucleotide art including tetrahydropyran-2'-yloxy, tetrahydrofuran-2'-yloxy, 4'-(lower)-alkoxytetrahydropyan-4'-yloxy groups, and the like.

By the term "lower alkyl" is meant a straight or branched chain aliphatic group containing one to six carbon atoms and one and two . . . and 6 carbon atoms and one to two . . . to six carbon atoms, e.g., methyl, ethyl, n-propyl, isopropyl, n-butyl, sec-butyl, isobutyl, t-butyl, pentyl, isopentyl, and hexyl. By the term "alkyl" in derivations thereof, i.e., alkoxy, alkylthio, alkylamino, dialkylamino, the alkyl moiety is one containing about 1 to 18 carbon atoms. By the term "aryl" in derivations thereof, such as aryloxy and arylthio, is meant an aryl group containing from 6 to 12 ring carbon atoms and is selected from phenyl, biphenyl, and naphthyl (preferably β-naphthyl) and mono or poly substituted derivatives thereof wherein the substituents are selected from nitro, amino, alkyl, alkoxy, halo, and alkylthio, the latter terms as defined herein, preferably monosubstituted methyl, ethyl, propyl, butyl, methoxy, ethoxy, propoxy, butoxy, bromo, fluoro, chloro, methylthio, ethylthio, propylthio, or butylthio. By the term "aralkyl" in derivations thereof, i.e., aralkoxy, aralkylthio, aralkylamino, diaralkylamino, the aralkyl moiety is one in which the alkyl portion contains about 1 to 8 carbon atoms, preferably methyl and ethyl and the aryl ("ar") portion is as defined above. By the term "halo" is meant bromo, chloro, fluoro, and iodo. By the term "acyl" is meant an acyl group containing 1 to 22 carbon atoms and being 1) a straight or branched, chain, saturated or unsaturated alkanoyl, 2) benzoyl, or 3) a substituted benzoyl group wherein the substituents are selected from alkyl, alkoxy, halo, and alkylthio, the latter terms as defined herein, preferably monosubstituted by methyl, chloro, bromo, or methoxy.

The term "pharmaceutically acceptable cations", as used herein, refers to cations of thos pharmaceutically acceptable salts conventionally employed in the nucleotide and nucleoside art such as the barium, calcium, sodium, potassium, ammonium, trimethylammonium and triethylammonium salts.

In the present application, nomenclature is employed which is not in strict conformity with "The Rules of Carbohydrate Nomenclature." For example, the compound named herein as 1,$N^6$-ethenoadenosine 3',5'-cyclicphosphate also may be properly referred to as 3-β-D-ribofuranosylimidazo[2,1-i]purine 3',5'-cyclicphosphate.

The following examples serve to further illustrate the present invention but should not be construed as limiting scope hereof.

EXAMPLE 1

To a solution of 2',3'-O-isopropylideneadenosine (10 moles) in 25 ml. of pyridine is slowly added monomethoxytrityl (12 moles) chloride in 25 ml. of pyridine. After the addition the mixture is kept for 18 hours at 20°C and then 15 moles of benzoyl chloride are added. The reaction is allowed to proceed at room temperature (20°C) for 24 hours. After this time, the reaction mixture is poured over ice and the resultant mixture partitioned between ethyl acetate and water. The organic layer is separated, washed with sodium bicarbonate and water and the washed mixture then evaporated to dryness. The residue is dissolved in a minimum of ethyl acetate and precipitated with hexane. The precipitate is hydrolyzed in a mixture of dimethylformamide (50 ml.) and 50 ml. of 80 percent acetic acid at 20°C for one hour. The solvents are removed under vacuum and the residue purified by chromatography. The purified material is crystallized from ethanol to provide the $N^6$-benzoyl-2',3'-O-isopropylideneadenosine product. In like manner, $N^6$-acetyl-2',3'-O-isopropylideneadenosine is prepared using acetyl chloride.

EXAMPLE 2

To a stirred solution of $N^6$-benzoyl 2',3'-O-isopropylideneadenosine (36.3 g., 88 mmoles) in dimethylsulfoxide (200 ml.) is added dicyclohexylcarbodiimide (54.6 g., 264 mmoles) and dichloracetic acid (3.52 ml., 44 mmoles). The initial exothermic reaction is controlled by cooling the mixture in an ice bath. After 90 minutes, a solution of oxalic acid (22 g., 210 mmoles) in methanol (75 ml.) is cautiously added in order to destroy the excess dicyclohexylcarbodiimide. The reaction mixture is filtered after stirring for a further 30 minutes and the residual N,N'-dicyclohexylurea washed throughly with methanol. N,N'-Diphenylethylenediamine (22 g., 105 mmoles) is added to the clear filtrate and after 15 minutes enough water is added to get a slightly turbid solution which is then stored overnight. The deposited crystals are collected by filtration and recrystallized from aqueous ethanol giving $N^6$-benzoyl-5'-deoxy-5'-(N,N'-diphenylethylenediamino)-2',3'-O-isopropylideneadenosine.

A mixture of the imidazolidine derivative (9.6 g., 16 mmoles) and dry Dowex 50 ($H^+$) resin (24 g.) in aqueous tetrahydrofuran (1:1) is stirred at room temperature for 40 minutes. The resin is removed by filtration and washed with tetrahydrofuran. The combined filtrates are evaporated in vacuo and the resulting precipitate is collected, washed with water, and dried in vacuo at 40°C giving $N^6$-benzoyl-2'-3'-O-isopropylideneadenosine 5'-aldehyde hydrate.

In like manner, $N^6$-acetyl-2',3'-O-isopropylideneadenosine 5'-aldehyde hydrate is prepared.

EXAMPLE 3

A 1M solution of methyl magnesium chloride (300 ml.) in tetrahydrofuran is added at 20°C over 10 minutes to a stirred suspension of the aldehyde hydrate of Example 2 (13.0 g., 30.6 mmoles) is freshly distilled tetrahydrofuran (1.5 l.) in a nitrogen atmosphere. After 30 minutes, saturated aqueous ammonium chloride (70 ml.) is added and the inorganic salts are removed by filtration and washed with ethyl acetate (3 × 250 ml.). The combined organic layers are washed with aqueous sodium bicarbonate (2 × 250 ml.), water (2 × 250 ml.) and dried over sodium sulfate. Removal of the solvent gives a mixture of isomeric products as a foam.

This mixture is applied to a column of silica gel (1.1 kg., 6 percent by weight water added) prepared in carbon tetrachloride. Elution with a linear gradient from carbon tetrachloride-chloroform 1:1 (4 liters) to carbon tetrachloride-chloroform-acetone 1:1:4 (4 liters) gives, after pooling of the appropriate fractions, $N^6$-benzoyl-9-(6-deoxy-2,3-O-isopropylidene-$\beta$-D-allofuranosyl)-adenine and $N^6$-benzoyl-9-(6-deoxy-2,3-O-isopropylidene-$\alpha$-L-talofuranosyl)-adenine together with a mixture of the compounds enriched in the $\alpha$-L-talo compound.

Employing an alkylmagnesium chloride other than methylmagnesium chloride in the above procedure produces the other 6-C-alkyl-6-deoxy compounds, for example $N^6$-benzoyl-9-(6-C-methyl-6-deoxy-2,3-O-isopropylidene-$\beta$-D-allofuranosyl)-adenine, $N^6$-benzoyl-9-(6-C-methyl-6-deoxy-2,3-O-isopropylidene-$\alpha$-L-talofuranosyl)-adenine, and the 16 compounds corresponding to the above two compounds in each of the 6-C-ethyl, 6-C-n-propyl, 6-C-isopropyl, 6-C-n-butyl, 6-C-sec-butyl, 6-C-isobutyl, 6-C-t-butyl, and 6-C-pentyl series. In like manner, the corresponding N-acetyl compounds are prepared from the respective N-acetyl substrates.

EXAMPLE 4

To a solution of $N^6$-benzoyl-9-(6-deoxy-2,3-O-isopropylidene-$\beta$-D-allofuranosyl)-adenine (246 mg., 1 mmole) and dicyclohexylcarbodiimide (620 mg., 3 mmoles) in a mixture of benzene (3 ml.), pyridine (0.08 ml.) and dimethylsulfoxide (3 ml.) is added trifluoroacetic acid (0.04 ml.). The mixture is maintained at about 20° to 25°C during the early exothermic reaction by occasional cooling in an ice bath and then stored at 20°C for 16 hours. Ethyl acetate (10 ml.) is added followed by a saturated methanolic solution of oxalic acid dihydrate (0.185 g.). After a further 30 minutes at 20°C, the N,N-dicyclohexylurea is removed by filtration and washed thoroughly with ethyl acetate. The combined filtrate and washings are extracted twice with water, dried (MgSO$_4$) and evaporated to dryness giving $N^6$-benzoyl-9-(6-deoxy-2,3-O-isopropylidene-$\beta$-D-ribo-hexofuran-5-ulosyl)-adenine as a foam.

The same product is obtained using $N^6$-benzoyl-9-(6-deoxy)-2,3-O-isopropylidene-$\alpha$-L-talofuranosyl)-adenine as the starting material. The same product is also prepared by preferably using the mixture of $\alpha$-L-talo and $\beta$-D-allo isomers.

EXAMPLE 5

The 5'-keto products of Example 4 are treated according to the procedure of Example 3 above to prepare $N^6$-benzoyl-2',3'-O-isopropylidene-5',5'-di-C-methyladenosine and the nine compounds corresponding to the above compound in each of the 5',5'-di-C-ethyl, -n-propyl, -isopropyl, -n-butyl, -sec-butyl, -isobutyl, -t-butyl, -pentyl and -hexyl series.

EXAMPLE 6

The alcohol $N^6$-benzoyl-9-(6-deoxy-2,2-O-isopropylidene-$\beta$-D-allofuranosyl)-adenine (1.40 g., 3.3 mmoles) is dried by evaporation in vacuo of a solution in dry pyridine (2 × 5 ml.). The residue is redissolved in dry pyridine (5 ml.) and a solution of bis-2,2,2-trichloroethylphosphorochloridate (6.25 g., 16.5 mmoles) in pyridine (10 ml.) is added at 0°C. The mixture is stirred for one hour at room temperature, cooled in an ice bath, water (10 ml.) is added and the mixture is evaporated to dryness in vacuo. The residue is dissolved in chloroform (100 ml.) and the solution washed with aqueous sodium bicarbonate solution (2 × 50 ml.), water (2 × 50 ml.) and dried over magnesium sulfate. Removal of the solvents in vacuo gives $N^6$-benzoyl-9-[6-deoxy-2,3-O-isopropylidene-5-O-(bis-2,2,2-trichloroethylphosphoryl)-$\beta$-D-allofuranosyl]-adenine as a foam.

By repeating the above procedure with $N^6$-benzoyl-9-(6-deoxy-2,3-O-isopropylidene-$\alpha$-L-talofuranosyl)-adenine, there is obtained $N^6$-benzoyl-9-[6-deoxy-2,3-O-isopropylidene-5-O-(bis-2,2,2-trichloroethylphosphoryl-$\alpha$-L-talofuranosyl]-adenine.

EXAMPLE 7

A solution of $N^6$-benzoyl-9-[6-deoxy-2,3-O-isopropylidene-5-O-(bis-2,2,2-trichloroethylphosphoryl)-$\beta$-D-allofuranosyl)-adenine (5.52 g., 7.2 mmoles) in 90 percent trifluoroacetic acid (60 ml.) is kept at room temperature for 30 minutes and then is concentrated in vacuo. The residue is largely freed of trifluoroacetic acid by repeated evaporation with ethanol. Addition of ether then gives a solid which slowly crystallizes and is collected by filtration giving $N^6$-benzoyl-9-[6-deoxy-5-O-(bis-2,2,2-trichloroethylphosphoryl)-$\beta$-D-allofuranosyl]-adenine.

By repeating the above procedure with $N^6$-benzoyl-9-[6-deoxy-2,3,-O-isopropylidene-5-O-(bis-2,2,2-trichloroethylphosphoryl)-$\alpha$-L-talofuranosyl]-adenine, there is obtained $N^6$-benzoyl-9-[6-deoxy-5-O-(bis-2,2,2-trichloroethylphosphoryl)-$\alpha$-L-talofuranosyl]adenine as foam following purification by silica-gel column chromatography.

EXAMPLE 8

Acetic acid (4 ml., 68 mmoles) is added dropwise to an ice-cold, stirred suspension of zinc dust (1.75 g., 27 mmoles) in a solution of the $N^6$-benzoyl-9-[6-deoxy-5-O-(bis-2,2,2-trichloroethylphosphoryl)-$\beta$-D-allofuranosyl]-adenine (1.1 g., 1.5 mmoles) in dimethylformamide (10 ml.). After 30 minutes at 0° to 5°C, the mixture filtered and the filtrate is concentrated in vacuo. Water (50 ml.) is added to the residue and a clear solution is obtained by the addition of Dowex 50 (NH$_4^+$). The zinc ions are removed by passing the solution through a Dowex 50 (NH$_4^+$) column (36 × 2 cm.). Concentration of the eluate gives a syrupy residue which is stirred at room temperature for 16 hours with 7N aqueous ammonium hydroxide (20 ml.). The solution is again evaporated to dryness and the residue is chromatographed on a column (40 × 3 cm.) of DEAE Sephadex (bicarbonate form) using a linear gradient elution from water (2.5 liters) to 0.25M triethylammonium bicarbonate pH 7.5 (2.5 liters). The appropriate fractions are pooled and concentrated giving the product as the triethylammonium salt (620 mg.). The salt is dissolved in 50 percent aqueous ethanol (3 ml.) and the solution is adjusted to pH 2.5 with 1N hydrochloric acid giving the 9-(6-deoxy-5-O-phosphoryl-$\beta$-D-allofuranosyl)-adenine product.

By repeating the above procedure with $N^6$-benzoyl-[6-deoxy-5-O-(bis-2,2,2-trichloroethylphosphoryl)-$\alpha$-L-talofuranosyl]adenine, there is obtained the corresponding 9-(6-deoxy-5-O-phosphoryl-$\alpha$-L-talofuranosyl)-adenine as a powder.

EXAMPLE 9

A suspension of (620 mg., 1.1 mmoles) of the triethylammonium salt of 9-(6-deoxy-5-O-phosphoryl-$\beta$-D-allofuranosyl)adenine in pyridine (25 ml.) is solubilized by the addition of 4-morpholine-N,N'-dicyclohexylcarboxamidine (322 mg., 1.1 mmoles).

The salt is dried by repeatedly adding dry pyridine followed by evaporation in vacuo. A solution of the residue in dry pyridine (120 ml.) is added, over two hours, to a refluxing solution of dicyclohexylcarbodiimide (495 mg., 2.2 mmoles) in dry pyridine (210 ml.). The solution is refluxed for a further two hours, the pyridine is removed in vacuo and the residue is partitioned between water (100 ml.) and ether (100 ml.). N,N'-Dicyclohexylurea is removed by filtration and the aqueous layer is chromatographed on a 40 × 3 cm. column of DEAE-Sephadex (bicarbonate form) using a linear gradient elution from water (2.5 liters) to 0.15M triethylammonium bicarbonate pH 7.5 (2.5 liters). The appropriate fractions are pooled and concentrated giving the product as the triethylammonium salt. A solution of this salt in 50 percent aqueous ethanol (4 ml.) is adjusted to pH 2 with 1N hydrochloric acid whereupon the free nucleotide separates out as crystals. These are collected, washed with water and ethanol and dried giving 9-(6-deoxy-β-D-allofuranosyl)-adenine 3',5'-cyclicphosphate.

By repeating the above procedure with 9-(6-deoxy-5-phosphoryl-α-L-talofuranosyl)-adenine, there is obtained the corresponding 9-(6-deoxy-α-L-talofuranosyl)-adenine 3',5'-cyclicphosphate.

In a similar manner, the following products are obtained: adenosine 3',5'-cyclicphosphate, 9-(6-deoxy-6-C-methyl-β-D-allofuranosyl)-adenine 3',5'-cyclicphosphate, 9-(6-deoxy-6-C-methyl-α-L-talofuranosyl)-adenine 3',5'-cyclicphosphate, 9-(6-deoxy-6-C-ethyl-β-D-allofuranosyl)-adenine 3',5'-cyclicphosphate, 9-(6-deoxy-6-C-ethyl-α-L-talofuranosyl)-adenine 3',5'-cyclicphosphate, 9-(6-deoxy-6-C-n-propyl-β-D-allofuranosyl)-adenine 3'5'-cyclicphosphate, 9-(6-deoxy-6-C-n-propyl-α-L-talofuranosyl)-adenine 3',5'-cyclicphosphate, 9-(6-deoxy-6-C-isopropyl-β-D-allofuranosyl)-adenine 3',5'-cyclicphosphate, 9-(6-deoxy-6-C-isopropyl-α-L-talofuranosyl)-adenine 3',5'-cyclicphosphate, and so forth.

EXAMPLE 10

A solution of freshly distilled bis-2,2,2-trichloroethylphosphorochloridate (12.65 g., 33 mmoles) in dry pyridine (25 ml.) is added dropwise to an ice-cold solution of $N^6$-benzoyl 2',3'-O-isopropylidene-5',5'-di-C-methyladenosine (1.43 g., 3.26 mmoles) in dry pyridine (50 ml.). The reaction mixture is stirred at 20° for 161 hours, cooled to 0°, treated with water (50 ml.) and kept at 20° for a further two hours. The solvents are removed in vacuo and the residue is partitioned between chloroform and water. The aqueous layer is extracted twice with chloroform, the combined organic extracts are successively washed with icecold 1N hydrochloric acid, water, saturated aqueous sodium bicarbonate, water and dried over magnesium sulfate. Evaporation of the solvents in vacuo gives residue (2.72 g.). This is chromatographed on a silica gel column (300 g.) using a linear gradient elution from carbon tetrachloride (2 liters) to carbon tetrachloride-acetone (7:3, 2 liters). The appropriate fractions are pooled and concentrated in vacuo to give the $N^6$-benzoyl-2',3'-O-isopropylidene-5',5'-di-C-methyl-5'-O-bis-2,2,2,-trichloroethylphosphoryladenosine product.

The resultant product is treated according to the procedures of Examples 7 to 9 to give the 5',5'-di-C-methyladenosine 3',5'-cyclicphosphate product.

In a similar manner, the following products are obtained: 5',5'-di-C-ethyladenosine 3',5'-cyclicphosphate, 5',5'-di-C-n-propyladenosine 3',5'-cyclicphosphate, 5',5'-di-C-isopropyladehosing 3', 5'-cyclicphosphate, 5',5'-di-C-n-butyladenosine 3',5'-cyclicphosphate, and so forth.

EXAMPLE 11

To a solution of 9-(6-deoxy-β-D-allofuranosyl)-adenine 3',5'-cyclicphosphate (from Example 9), (343 mg., 1 mmole) in 1 ml. of 1N sodium hydroxide is added 6 ml. of 1N sodium acetate buffer (pH 3.9). A solution of bromine (220 mg.) in 8 ml. of 1M sodium acetate buffer (pH 3.9) is then added and the resulting solution is stirred overnight at 20°C. The resulting precipitate is collected by filtration and washed with water to give the chromatographically pure product namely 8-bromo-9-(6-deoxy-β-D-allofuranosyl)-adenine 3',5'-cyclicphosphate. The filtrate is passed through a charcoal column (4 g.) and the column is washed with water. An additional quantity of the product is obtained by elution of the charcoal column with the solvent mixture ethanol-water-ammonium hydroxide (50:45:5) followed by crystallization of the product as the free acid at pH 2-3.

In like manner, the 3'-cyclic ester of 8-bromo-5'-deoxy-5'-dihydroxyphosphinylmethyladenosine, the 5'-cyclic ester of 8-bromo-3'-deoxy-3'-dihydroxyphosphinylmethyladenosine, and 8-bromoadenosine 3',5'-cyclicphosphate and the corresponding 8-bromo compounds in the other 5'-C-alkyl and 5',5'-di-C-alkyl series, e.g., 8-bromo-9-(6-deoxy-α-L-talofuranosyl)-adenine 3',5'-cyclicphosphate and 5',5'-di-C-methyl-8-bromoadenosine 3',5'-cyclicphosphate, are prepared from the respective starting compounds.

EXAMPLE 12

8-bromo-9-(6-deoxy-β-D-allofuranosyl)-adenine 3',5'-cyclicphosphate (422 mg., 1mmole) is added to a solution of methanol (10ml.) containing sodium methoxide (2.2 g., 4 mmoles) and methanethiol (1 ml.). The resulting reaction mixture is heated under reflux for 4 hours and then the solvent is removed by evaporation in vacuo. The residue is dissolved in water and the pH of the solution is adjusted to less than 3 by the addition of 3N hydrochloric acid causing crystallization of the product. The crystals are filtered, washed with water and dried to give 9-(6-deoxy-β-D-allofuranosyl)-8-methylthioadenine 3',5'-cyclicphosphate.

In like manner, 9-(6-deoxy-β-L-talofuranosyl)-8-methyl-thioadenine 3',5'-cyclicphosphate, 5',5'-di-C-methyl-8-methylthioadenosine 3',5'-cyclicphosphate, the 3'-cyclic ester of 8-methylthio-5'-deoxy-5'-dihydroxyphosphinylmethyladenosine, and the 5'-cyclic ester of 8-methylthio-3'-deoxy-3'dihydroxyphosphinylmethyladenosine, are prepared.

Upon substituting an alternate alkanethiol for methanethio in the above procedure, the corresponding 8-alkylthio products are prepared. Similarly the 8-arylthio products e.g., 9-(6-deoxy-β-D-allofuranosyl)-8-phenylthioadenine 3',5'-cyclicphosphate, 9-(6-deoxyβ-L-talofuranosyl)-8-phenylthioadenine 3',5'-cyclicphosphate, 5',5'-di-C-methyl-8-phenylthioadenosine 3',5'-cyclicphosphate, 8-phenylthioadenosine 3',5'-cyclicphosphate, the 3'-cyclic ester of 8-phenylthio-5'-deoxy-5'-dihydroxyphosphinylmethyladenosine, and the 5'-cyclic ester of 8-phenylthio-3'-deoxy-3'-dihydroxyphosphinylmethyladenosine, are prepared. Similarly the 8-aralkylthio products e.g., 9-(6-deoxy-β-

D-allofuranosyl)-8-benzylthioadenine 3',5'-cyclicphosphate, 9-(6-deoxy-α-L-talofuranosyl)-8-benzylthioadenine 3',5'-cyclicphosphate, 5',5'-di-C-methyl-8-benzylthioadenosine 3',5'-cyclicphosphate, 8-benzylthioadenosine 3',5'-cyclicphosphate, the 3'-cyclic ester of 8-benzylthio 5'-deoxy-5'-dihydroxyphosphinylmethyladenosine, and the 5'-cyclic ester of 8-benzylthio-3'-deoxy-3'-dihydroxyphosphinylmethyladenosine, are prepared. Also, the corresponding 8-p-substituted phenylthio compounds are thus prepared, e.g., 8-(p-fluorophenylthio)-adenine 3',5'-cyclicphosphate, 8-(p-methoxyphenylthio)-adenine 3',5'-cyclicphosphate, and 8-(o,p-dinitrophenylthio)-adenine 3',5'-cyclicphosphate.

EXAMPLE 13

A solution of 8-bromo-9-(6-deoxy-β-D-allofuranosyl)-adenine 3',5'-cyclicphosphate (422 mg., 1 mmole) and bensylamine (0.42 g., 4 mmoles) in 5 ml. ethanol and 1 ml. of dimethylsulfoxide is heated under reflux for 16 hours. The reaction mixture is cooled to room temperature, diluted to a volume of 100 ml. with water and applied to a column of DEAE-sephadex (45 cm × 2.3 cm.)(bicarbonate form). The column is eluted with a linear gradient of triethylammonium bicarbonate (2 liters of 0.005M to 2 liters of 0.15M). The appropriate fractions containing the product are pooled and evaporated to dryness in vacuo. The residue is dissolved in 50 percent aqueous ethanol and the pH of the solution is adjusted to less than 3 by the addition of 3N hydrochloric acid. The crystals formed are collected by filtration, washed with water and dried giving 8-benzylamino-9-(6-deoxy-β-D-allofuranosyl)-adenine 3',5'-cyclicphosphate.

In like manner, 9-(6-deoxy-α-L-talofuranosyl)-8-benzylaminoadenine 3',5'-cyclicphosphate, 5',5'-di-C-methyl-8-benzylaminoadenosine 3',5'-cyclicphosphate, 8-benzylaminoadenosine 3',5'-cyclicphosphate, the 3'-cyclic ester of 8-benzylamino-5'-deoxy-5'-dihydroxyphosphinylmethyladenosine, and the 5'-cyclic ester of 8-benzylamino-3'-deoxy-3'-dihydroxyphosphinylmethyladenosine are prepared.

Similarly, by substituting an alternate aralkylamine or an alkylamine for benzylamine in the above procedure, the corresponding 8-substituted products, e.g., 9-(6-deoxy-β-D-allofuranosyl)-8-methylaminoadenine 3',5'-cyclicphosphate, are prepared.

In like manner, by substituting a dialkylamine or diaralkylamine for benzylamine, the corresponding 8-dialkylamino and 8-diaralkylamino products hereof are prepared.

EXAMPLE 14

A solution of 8-bromo-9-(6-deoxy-β-D-allofuranosyl)adenine 3',5'-cyclicphosphate (422 mg., 1 mmole) in 6 ml. of methanol containing sodium (115 mg., 5 mmole) is heated at reflux for 6 hours. The solvent is evaporated in vacuo and the residue is purified as in the procedure of Example 16 giving 9-(6-deoxy-β-D-allofuranosyl)-8-methoxyadenine 3',5'cyclicphosphate.

In like manner, 9-(6-deoxy-β-L-talofuranosyl)-8-methoxyadenine 3',5'-cyclicphosphate, 5',5'-di-C-methyl-8-methoxyadenosine 3',5'-cyclicphosphate, 8-methoxyadenoxine 3',5'cyclicphosphate, the 3'-cyclic ester of 8-methoxy-5'-deoxy-5'-dihydroxyphosphinylmethyladenosine, and the 5'-cyclic ester of 8-methoxy-3'-deoxy-3'-dihydroxyphosphinylmethyladenosine, are prepared.

Similarly, by substituting an alternate alkyl alcohol or aryl alcohol, aralkyl alcohol for methanol, the corresponding 8-alkoxy and 8-aryloxy and 8-aralkoxy products, e.g., 9-(6-deoxy-β-D-allofuranosyl)-8-ethoxyadenine and 8-phenyloxyadenine 3',5'-cyclicphosphate and 8-benzyloxyadenine 3',5'-cyclicphosphate are prepared.

EXAMPLE 15

A dimethylformamide (40 ml.) solution of 8-bromo-9-(6-deoxy-β-D-allofuranosyl)-adenine 3',5'-cyclicphosphate, (422 mg., 1 mmole) and sodium azide (0.13 g., 2 mmoles) is heated at 70° for 16 hours. Evaporation of the solvent in vacuo gives the crude product which is purified and crystallized giving 8-azido-9-(6-deoxy-β-D-allofuranosyl)-adenine 3',5'-cyclicphosphate.

In like manner, the corresponding 8-azido substituted starting compounds hereof are prepared.

EXAMPLE 16

The product from Example 15 is dissolved in 40 ml. of water by the addition of 1 ml. of 1N sodium hydroxide. The solution is shaken in a hydrogen atmosphere in the presence of 10 percent palladium on charcoal (200 mg.) for 16 hours. The suspension is filtered through diatomaceous earth material and the filtrate is evaporated in vacuo to dryness. The residue is purified and crystallized as in the procedure of Example 16 giving 8-amino-9-(6-deoxy-β-D-allofuranosyl)-adenine 3',5'-cyclicphosphate.

In like manner, 9-(6-deoxy-β-L-talofuranosyl)-8-aminoadenine 3',5'-cyclicphosphate, 5',5'-di-C-methyl-8-aminoadenosine 3',5'-cyclicphosphate, 8-aminoadenosine 3',5'-cycylcphosphate, the 3'-cyclic ester of 8-amino-5'-deoxy-5'-dihydroxyphosphinylmethyladenosine, and the 5'-cyclic ester of 8-amino-3'-deoxy-3'-dihydroxyphosphinylmethyladenosine, are prepared.

The acylamino compounds are prepared as described above by treatment of the amino compound with an acid anhydride.

EXAMPLE 17

A solution of 1N sodium hydroxide (7 ml.) thiourea (0.76 g., 10 mmoles) and 8-bromo-9-(6-deoxy-β-D-allofuranosyl)-adenine 3',5'-cyclicphosphate (2.11 g., 5 mmoles) is evaporated in vacuo to a solid residue. This is dissolved in 2-methoxyethanol (100 ml.) and the solution is heated at 100° for 48 hours. The reaction mixture is evaporated to dryness and the residue is purified and crystallized as in the procedure of Example 16 giving 9-(6-deoxy-β-D-allofuranosyl)-8-mercaptoadenine 3',5'-cyclicphosphate.

In like manner, 9-(6-deoxy-α-L-talofuranosyl)-8-mercaptoadenine 3',5'-cyclicphosphate, 5',5'-di-C-methyl-8-mercaptoadenosine 3',5'-cyclicphosphate, 8-mercaptoadenosine 3',5'-cyclicphosphate, the 3'-cyclic ester of 8-mercapto-5'-deoxy-5'-dihydroxyphosphinylmethyladenosine, and the 5'-cyclic ester of 8-mercapto-3'-deoxy-3'-dihydroxyphosphinylmethyladenosine, are prepared.

EXAMPLE 18

A solution of 8-bromo-9-(6-deoxy-β-D-allofuranosyl)-adenine 3',5'-cyclicphosphate (833 mg., 2 mmoles), sodium acetate (1.64 g., 20 mmoles), acetic anhydride (4 ml.) and glacial acetic acid (40 ml.) is heated at 110°C for 4 hours. The reaction mixture is evaporated to dryness in vacuo and the residue is dissolved in methanolic ammonia and heated at 50°C for 3 days in a bomb. Evaporation of the solvent followed by purification and crystallization gives 9-(6-deoxy-β-D-allofuranosyl)-8-hydroxyadenine 3',5'-cyclicphosphate.

In like manner, the other 8-hydroxy substituted starting compounds thereof are prepared.

EXAMPLE 19

A solution of 9-(6-deoxy-β-D-allofuranosyl)-adenine 3',5'-cyclicphosphate (343 mg. 1 mmole) in 5 ml. water and 0.14 ml. of triethylamine is evaporated to dryness in vacuo. The residue is dried by coevaporation three times with pyridine (5 ml.), dissolved in 10 ml. of anhydrous pyridine and 2.5 ml. of butyric anhydride is added. The resultant solution is stirred at 20°C in the dark for 16 hours, cooled in an ice-water bath, 5 ml. of water is added and the resultant mixture is kept at 0°-5°C for 3 hours. The solvent is removed by evaporation in vacuo and the residue is dissolved in 100 ml. water and applied to a DEAE sephadex column (40 cm. × 2.5 cm.)(bicarbonate form). The column is eluded with a linear gradient of triethylammonium bicarbonate (2 liters of 0.005M to 2 liters of 0.15M); the appropriate ultraviolet light absorbing fractions are pooled and evaporated to dryness in vacuo at a temperature less than 35°C giving the triethylammonium salt of 9-(2-O-butyryl-(6-deoxy-β-D-allofuranosyl)-adenine 3',5'-cyclicphosphate. Other salt forms of the product are obtained either by precipitation techniques e.g., the calcium salt is prepared by the addition of ether to an ethanolic solution of calcium chloride and the product or by the utilization of ion-exchange techniques e.g., passage of an aqueous solution of the calcium salt of the product through a column of Dowex × 50 (Na⁻) yielding, after evaporation in vacuo, the sodium salt of the product. In like manner, the other 2'-O-acyl, e.g., acetyl, compounds hereof are prepared upon use of an alternate acyl anhydride.

EXAMPLE 20

By repeating the procedure of Example 19 except that 5.0 ml. of butyric anhydride is used and that the reaction mixture is stored at 20°C for seven days gives the triethylammonium salt of 9-(2-O-butyryl-6-deoxy-β-D-allofuranosyl)-N⁶-butyryladenine 3',5'-cyclicphosphate, which is converted to the calcium salt and/or the sodium salt by procedures as those described in Example 19.

EXAMPLE 21

To a solution of 9-(2-O-butyryl-6-deoxy-β-D-allofuranosyl)-N⁶-butyryladenine 3',5'-cyclicphosphate (0.5 mmole) in 20 ml. ethanol is added 1 ml. of 2N sodium hydroxide and the resultant mixture is kept at 20° for five minutes. The solution is rapidly cooled to about 5°C in an ice-bath and the pH is adjusted to 3 with 2N hydrochloric acid. The solution is then extracted several times with ether and then adjusted to pH 7 with ammonium hydroxide. After dilution with 100 ml. of water, the mixture is chromatographed on a DEAE sephadex column (40 × 25 cm.) (bicarbonate form) by elution with a linear gradient of triethylammonium bicarbonate (2 liter of 0.005M to 2 liters of 0.15M). The appropriate fractions are pooled and evaporated to dryness giving the triethylammonium salt of 9-(6-deoxy-β-D-allofuranoxyl)-N⁶ butyryladenine 3',5'-cyclicphosphate, which is converted to the calcium salt and/or the sodium salt by procedures as those described in Example 19.

EXAMPLE 22

Bromine (30 g., 0.187 mole) is added dropwise to a stirred solution at −10°C of valeraldehyde (20 ml., 0.186 mole) and di-t-butylperoxide (0.3g.) in ether (40 ml.) under illumination from a 150W clear tungsten lamp. At the end of the addition, the ethereal solution is extracted with aqueous sodium bicarbonate solution, water and then dried over magnesium sulfate. The ether is removed by distillation at atmospheric pressure and the residue is distilled through a small vigreux column, using a nitrogen air leak, giving α-bromovaleraldehyde with bP 53°C at 15 mm. Hg.

In like manner, the foregoing can be practiced with use of chlorine to give the corresponding α-chlorovaleraldehyde product.

EXAMPLE 23

The procedures of EXAMPLE 22 are repeated using the compounds listed in Column A below, in lieu of valeraldehyde, to give the corresponding products listed in column B below:

| Column A | Column B |
| --- | --- |
| propionaldehyde | α-bromopropionaldehyde |
| n-butyraldehyde | α-bromobutyraldehyde |
| α-isopropylacetaldehyde | α-bromo-α-isopropylacetaldehyde |
| α-n-butylacetaldehyde | α-bromo-α-n-butylacetaldehyde |
| α-t-butylacetaldehyde | α-bromo-α-t-butylacetaldehyde |
| α-pentylacetaldehyde | α-bromo-α-pentylacetaldehyde |
| α-hexylacetaldehyde | α-bromo-α-hexylacetaldehyde |
| α-heptylacetaldehyde | α-bromo-α-heptylacetaldehyde |
| α-octylacetaldehyde | α-bromo-α-octylacetaldehyde |
| α-nonylacetaldehyde | α-bromo-α-nonylacetaldehyde |
| α-decylacetaldehyde | α-bromo-α-decylacetaldehyde |
| acetaldehyde | α-bromoacetaldehyde |
| α-p-methylphenyl-acetaldehyde | α-bromo-α-p-methylphenyl-acetaldehyde |
| α-p-methoxyphenyl-acetaldehyde | α-bromo-α-p-methoxyphenyl-acetaldehyde |
| α-p-chlorophenyl-acetaldehyde | α-bromo-α-p-chlorophenyl-acetaldehyde |
| α-napth-2-yl-acetaldehyde | α-bromo-α-naphth-2-yl-acetaldehyde |

α-chloroacetaldehyde and α-bromo-α-phenylacetaldehyde are also thus prepared from acetaldehyde and α-phenylacetaldehyde, respectively.

EXAMPLE 24 n-Butyric acid (1 mole) is heated with phosphorus tribromide (0.5 mole) for 1.5 to 2 hours at 150°C. The acid bromide product is distilled from the mixture. The resultant n-butyric acid bromide (1 mole) is added slowly to an icecold ethereal solution of diazomethane (2 moles) (dried over KOH for at least 3 hours). After 30 minutes at 0°C, dry hydrogen bromide is passed in until an excess is present. The solution is kept at 0°C for 30 minutes and then washed with water and sodium hydrogen carbonate solution. The dried ethereal solution is evaporated and the residual oil distilled under reduced pressure to give n-propyl bromomethyl ketone.

In like manner, the foregoing can be practiced with use of acid chloride and hydrogen chloride to give the corresponding n-propyl chloromethyl ketone.

EXAMPLE 25

The procedures of Example 24 are repeated using the compounds listed in Column C below, in lieu of n-butyric acid to give the corresponding products listed in Column D below:

| Column C | Column D |
| --- | --- |
| acetic acid | methyl bromomethyl ketone |
| propionic acid | ethyl bromomethyl ketone |
| iso-butyric acid | isopropyl bromomethyl ketone |
| n-valeric acid | n-butyl bromomethyl ketone |
| pivalic acid | t-butyl bromomethyl ketone |
| caproic acid | pentyl bromomethyl ketone |
| enanthic acid | hexyl bromomethyl ketone |
| caprylic acid | heptyl bromomethyl ketone |
| pelargonic acid | octyl bromomethyl ketone |
| capric acid | nonyl bromomethyl ketone |
| undecanoic acid | decyl bromomethyl ketone |
| p-methylbenzoic acid | p-methylphenyl bromomethyl ketone |
| p-methoxybenzoic acid | p-methoxyphenyl bromomethyl ketone |
| p-chlorobenzoic acid | p-chlorophenyl bromomethyl ketone |
| β-naphthoic acid | napth-2-yl- bromomethyl ketone |

Phenyl bromomethyl ketone is also thus prepared from benzoic acid.

EXAMPLE 26

A solution of adenosine 3',5'-cyclicphosphate (329 mg., 1 mmole) in 45 percent aqueous chloroacetaldehyde (prepared as described in Examples 22 and 23) solution (4 ml.) and 0.1M sodium acetate buffer pH 5.0 (20 ml.) is heated at 50°C for 24 hours. The mixture is diluted with water (100 ml.) and applied to a column of DEAE sephadex (40 cm. × 2.5 cm.) which is eluted with a linear gradient of triethylammonium bicarbonate buffer pH 7.5 (2 liters 0.005M to 2 liters 0.2M). The appropriate fluorescent fractions are pooled and evaporated to dryness to give the triethylammonium salt of 1, $N^6$-ethenoadenosine 3',5'-cyclicphosphate. The salt is dissolved in 5 ml. of aqueous ethanol (1:1 v/v) and the pH is adjusted to 2.5 by the addition of 3N hydrochloric acid and the crystals thus formed are collected by filtration, washed with aqueous ethanol and dried to give 1, $N^6$-ethenoadenosine 3',5'-cyclicphosphate.

The above reaction can be conducted in aqueous dimethylformamide with similar results.

The foregoing reaction, when conducted using each of 2-bromovaleraldehyde and α-bromo-α-phenylacetaldehyde, prepares 1,$N^6$-α-n-propylethenoadenosine 3',5'-cyclicphosphate and 1,$N^6$-α-phenylethenoadenosine 3',5'-cyclicphosphate, respectively.

EXAMPLE 27

The procesures of Example 26 are repeated to prepare the following 1, $N^6$-etheno products from the respective starting compounds:

1,$N^6$-etheno-8-bromoadenosine 3',5'-cyclicphosphate,
1,$N^6$-etheno-8-chloroadenosine 3',5'-cyclicphosphate,
1,$N^6$-ehteno-8-hydroxyadenosine 3',5'-cyclicphosphate,
1,$N^6$-etheno-8-methoxyadenosine 3',5'-cyclicphosphate,
1,$N^6$-etheno-8-benzylthioadenosine 3',5'-cyclicphosphate,
1,$N^6$-etheno-8-aminoadenosine 3',5'-cyclicphosphate,
1,$N^6$-etheno-8-dimethylaminoadenosine 3',5'-cyclicphosphate,
1,$N^6$-etheno-2'-O-acetyladenosine 3',5'-cyclicphosphate,
1,$N^6$-etheno-2'-O-butyryladenosine 3',5'-cyclicphosphate,
1,$N^6$-etheno-2'-O-benzoyladenosine 3',5'-cyclicphosphate,
1,$N^6$-2'-O-acetyl-8-bromoadenosine 3',5'-cyclicphosphate, the 3'-cyclic ester of 1,$N^6$-etheno-5'-deoxy-5'-dihydroxyphosphinylmethyladenosine,
the 3'-cyclic ester of 1,$N^6$-etheno-8-bromo-5'-deoxy-5'-dihydroxyphosphinylmethyladenosine,
the 3'-cyclic ester of 1,$N^6$-etheno-8-ethoxy-5'-deoxy-5'-dihydroxyphosphinylmethyladenosine,
the 3'-cyclic ester of 1,$N^6$-etheno-8-mercapto-5'-deoxy-5'-dihydroxyphosphinylmethyladenosine,
the 3'-cyclic ester of 1, $N^6$-etheno-8-(methylthio)-5'-deoxy-5'-dihydroxyphosphinylmethyladenosine,
the 3'-cyclic ester of 1, $N^6$-etheno-8-methylamino-5'-deoxy-5'-dihydroxyphosphinylmethyladenosine,
the 3'-cyclic ester of 1, $N^6$-etheno-8-benzylthio-5'-deoxy-5'-dihydroxyphosphinylmethyladenosine,
the 5'-cyclic ester of 1, $N^6$-etheno-3'-deoxy-3'-dihydroxyphosphinylmethyladenosine,
the 5'-cyclic ester of 1, $N^6$-etheno-8-bromo-3'-deoxy-3'-dihydroxyphosphinylmethyladenosine,
the 5'-cyclic ester of 1, $N^6$-etheno-8-ethoxy-3'-deoxy-3'-dihydroxyphosphinylmethyladenosine,
the 5'-cyclic ester of 1, $N^6$-etheno-8-mercapto-3'-deoxy-3'-dihydroxyphosphinylmethyladenosine,
the 5'-cyclic ester of 1, $N^6$-etheno-8-(methylthio)-3'-deoxy-3'-dihydroxyphosphinylmethyladenosine,
the 5'-cyclic ester of 1, $N^6$-etheno-8-methylamino-3'-deoxy-3'-dihydroxyphosphinylmethyladenosine,
the 5'-cyclic ester of 1, $N^6$-etheno-8-benzylthio-3'-deoxy-3'-dihydroxyphosphinylmethyladenosine,
1, $N^6$-etheno-9-(6-deoxy-α-D-allofuranosyl)-adenine 3',5'-cyclicphosphate,
1, $N^6$-etheno-9-(6-deoxy-α-L-talofuranosyl)-adenine 3',5'-cyclicphosphate,
1, $N^6$-etheno-9-(2-O-benzoyl-6-deoxy-α-D-allofuranosyl)-adenine 3',5'-cyclicphosphate,
1, $N^6$-etheno-9-(2-O-benzoyl-6-deoxy-α-L-talofuranosyl)-adenine 3',5'-cyclicphosphate,
1, $N^6$-ethene-8-benzylthio-9-(6-deoxy-α-D-allofuranosyl)-adenine 3',5'-cyclicphosphate,
1,$N^6$-etheno-8-benzylthio-9-(6-deoxy-α-L-talofuranosyl)-adenine 3',5'-cyclicphosphate,
1,$N^6$-etheno-di-C-methyladenosine 3',5'-cyclicphosphate,
1,$N^6$-etheno-8-benzylthio-5',5'-di-C-methyladenosine 3',5'-cyclicphosphate,
1,$N^6$-etheno-2'-O-acetyl-5',5'-di-C-methyladenosine 3',5'-cyclicphosphate,
1,$N^6$-etheno-2'-O-acetyl-8-bromo-5',5'-di-C-methyladenosine 3',5'-cyclicphosphate,
1,$N^6$-etheno-5',5'-di-C-ethyladenosine 3',5'-cyclicphosphate,
1,$N^6$-etheno-8-methylthioadenosine 3',5'-cyclicphosphate,
1,$N^6$-etheno-8-p-fluorophenylthioadenosine 3',5'-cyclicphosphate,
1,$N^6$-etheno-8-phenylthioadenosine 3',5'-cyclicphosphate,
1,$N^6$-etheno-8-ethylthioadenosine 3',5'-cyclicphosphate,
1,$N^6$-etheno-8-propylthioadenosine 3',5'-cyclicphosphate, 1,N⁶-etheno-8-butylthioadenosine 3',5'-cyclicphosphate,
1,N⁶-etheno-8-methylthio-9-(6-deoxy-α-D-allofuranosyl)-adenine 3',5'-cyclicphosphate,
1,N⁶-etheno-8-methylthio-9-(6-deoxy-α-L-talofuranosyl)-adenine 3',5'-cyclicphosphate,
1,N⁶-etheno-8-methylthio-5',5'-di-C-methyladenosine 3',5'-cyclicphosphate,
1,N⁶-etheno-8-ethylthio-9-(6-deoxy-α-D-allofurnaosyl)-adenine 3',5'-cyclicphosphate,
1,N⁶-etheno-8-ethylthio-9-(6-deoxy-α-L-talofuranosyl)-adenine 3',5'-cyclicphosphate, and
1, N⁶-etheno-8-ethylthio-5',5'-di-C-methyladenosine 3',5'-cyclicphosphate.

EXAMPLE 28

To a suspension of adenosine 3',5'-cyclicphosphate (329 mg., 1 mmole) in 0.5M sodium 2-morpholinoethane sulfonate pH 5 buffer (4 ml.) and dimethylformamide is added α-bromo-α-phenylacetaldehyde (1.0 g.). The resultant mixture is stirred at 50°C for 16 hours and then evaporated to dryness in vacuo. The residue is dissolved in water (50 ml.), the pH is adjusted to 7 with 2N sodium hydroxide and the solution is extracted with ether (20 ml.). The aqueous phase is diluted with 150 ml. water and applied to a column of DEAE sephadex (45 × 2.3 cm.) (bicarbonate form) which is eluted with a linear gradient of triethylammonium bicarbonate (3liters 0.005M to 3 liters of 0.2M). The appropriate fluorescent fractions are pooled, evaporated in vacuo, the residue is dissolved in 2 ml. water and the pH is adjusted to 2 with 3N hydrochloric acid. The crystals are filtered off, washed well with water and dried in vacuo giving 1,N⁶-α-phenylethenoadenosine 3',5'-cyclicphosphate.

EXAMPLE 29

The procedures of Example 28 are repeated using the compound product of Example 22 and the compounds listed in Column B (Example 23) above to prepare the corresponding 1, N⁶-α-substituted etheno products, to wit:

1, N⁶-α-n-propylethenoadenosine 3',5'-cyclicphosphate,
1, N⁶-α-methylethenoadenosine 3',5'-cyclicphosphate,
1, N⁶-α-ethylethenoadenosine 3',5'-cyclicphosphate,
1, N⁶-α-isopropylethenoadenosine 3',5'-cyclicphosphate,
1, N⁶-α-n-butylethenoadenosine 3',5'-cyclicphosphate,
1, N⁶-α-t-butylethenoadenosine 3',5'-cyclicphosphate,
1, N⁶-α-pentylethenoadenosine 3',5'-cyclicphosphate,
1, N⁶-α-hexylethenoadenosine 3',5'-cyclicphosphate,
1, N⁶-α-heptylethenoadenosine 3',5'-cyclicphosphate,
1, N⁶-α-octylethenoadenosine 3',5'-cyclicphosphate,
1, N⁶-α-nonylethenoadenosine 3',5'-cyclicphosphate,
1, N⁶-α-decylethenoadenosine 3',5'-cyclicphosphate,
1, N⁶-α-p-methylphenylethenoadenosine 3',5'-cyclicphosphate,
1, N⁶-α-p-methoxyphenylethenoadenosine 3',5'-cyclicphosphate,
1, N⁶-α-p-chlorophenylethenoadenosine 3',5'-cyclicphosphate, and
1, N⁶-α-napth-2-ylethenoadenosine 3',5'-cyclicphosphate,

EXAMPLE 30

The procedures of Example 29 are repeated to prepare the following 1, N⁶-α-substituted etheno products from the respective starting compounds:

1, N⁶-α-n-propyletheno-8-bromoadenosine 3',5'-cyclicphosphate,
1, N⁶-α-n-propyletheno-8-hydroxyadenosine 3',5'-cyclicphosphate,
1, N⁶-α-n-propyletheno-8-benzylthioadenosine 3',5'-cyclicphosphate,
1, N⁶-α-n-propyletheno-8-aminoadenosine 3',5'-cyclicphosphate,
1, N⁶-α-n-propyletheno-2'-O-benzoyladenosine 3',5'-cyclicphosphate, the 3'-cyclic ester of 1, N⁶-α-n-propyletheno-5'-deoxy-5'-dihydroxyphosphinylmethyladenosine,
the 3'-cyclic ester of 1, N⁶-α-n-propyletheno-8-mercapto-5'-deoxy-5'-dihydroxyphosphinylmethyladenosine,
the 3'-cyclic ester of 1, N⁶-α-n-propyletheno-8-methylthio-5'-deoxy-5'-dihydroxyphosphinylmethyladenosine,
the 3'-cyclic ester of 1, N⁶-α-n-propyletheno-8-benzylthio-5'-deoxy-5'-dihydroxyphosphinylmethyladenosine,
the 5'-cyclic ester of 1, N⁶-α-n-propyletheno-3'-deoxy-3'-dihydroxyphosphinylmethyladenosine,
the 5'-cyclic ester of 1, N⁶-α-n-propyletheno-8-mercapto-3'-deoxy-3'-dihydroxyphosphinylmethyladenosine,
the 5'-cyclic ester of 1, N⁶-α-n-propyletheno-8-methylthio-3'-deoxy-3'-dihydroxyphosphinylmethyladenosine,
the 5'-cyclic ester of 1, N⁶-α-n-propyletheno-8-benzylthio-3'-deoxy-3'-dihydroxyphosphinylmethyladenosine,
1, N⁶-α-n-propyletheno-9-(6-deoxy-β-D-allofuranosyl)-adenine 3',5'-cyclicphosphate,
1, N⁶-α-n-propyletheno-9-(6-deoxy-α-L-talofuranosyl)-adenine 3',5'-cyclicphosphate,
1, N⁶-α-n-propyletheno-8-benzylthio-9-(6-deoxy-β-D-allofuranosyl)-adenine 3',5'-cyclicphosphate,
1, N⁶-α-n-propyletheno-8-benzylthio-9-(6-deoxy-α-L-talofuranosyl)-adenine 3',5'-cyclicphosphate,
1, N⁶-α-n-propyletheno-5',5'-di-C-methyladenosine 3',5'-cyclicphosphate,
1, N⁶-α-n-propyletheno-8-benzylthio-5',5'-di-C-methyladenosine 3',5'-cyclicphosphate,
1, N⁶-α-n-propyletheno-2'-O-acetyl-8-benzylthio-5',5'-di-C-methyladenosine 3',5'-cyclicphosphate,
1, N⁶-α-phenyletheno-8-bromoadenosine 3',5'-cyclicphosphate,
1, N⁶-α-phenyletheno-8-hydroxyadenosine 3',5'-cyclicphosphate,
1, N⁶-α-phenyletheno-8-benzylthioadenosine 3',5'-cyclicphosphate,
1, N⁶-α-phenyletheno-8-aminoadenosine 3',5'-cyclicphosphate,
1, N⁶-α-phenyletheno-2'-O-benzoyladenosine 3',5'-cyclicphosphate,
the 3'-cyclic ester of 1, N⁶-α-phenyletheno-5'-deoxy-5'-dihydroxyphosphinylmethyladenosine,
the 3'-cyclic ester of 1, N⁶-α-phenyletheno-8-mercapto-5'-deoxy-5'-dihydroxyphosphinylmethyladenosine,
the 3'-cyclic ester of 1, N⁶-α-phenyletheno-8-methylthio-5'-deoxy-5'-dihydroxyphosphinylmethyladenosine, the 3'-cyclic ester of 1, N⁶-α- phenyletheno-8-benzylthio-5'-deoxy-5'-dihydroxyphosphinylmethyladenosine, the 5'-cyclic ester of 1, N⁶-α-phenyletheno-3'-deoxy-3'-dihydroxyphosphinylmethyladenosine, the 5'-cyclic ester of 1, N⁶-α-phenyletheno-8-mercapto-3'-deoxy-3'-dihydroxyphosphinylmethyladenosine, the 5'-cyclic ester of 1, N⁶-α-phenyletheno-8-methylthio-3'-deoxy-3'-dihydroxyphosphinylmethyladenosine, the 5'-cyclic ester of 1, N⁶-α-phenyletheno-8-benzylthio-3'-deoxy-3'-dihydroxyphosphinylmethyladenosine, 1, N⁶-α-phenyletheno-9-(6-deoxy-β-D-allofuranosyl)-adenine 3',5'-cyclicphosphate, 1, N⁶-α-phenyletheno-9-(6-deoxy-α-L-talofuranosyl)-adenine 3',5'-cyclicphosphate, 1, N⁶-α-phenyletheno-8-benzylthio-9-(6-deoxy-β-D-allofuranosyl)-adenine 3',5'-cyclicphosphate, 1,N⁶-α-phenyletheno-8-benzylthio-9-(6-deoxy-α-L-talofuranosyl)-adenine 3',5'-cyclicphosphate, 1,N⁶-α-phenyletheno-5',5'-di-C-methyladenosine 3',5'-cyclicphosphate, 1,N⁶-α-phenyletheno-8-benzylthio-5',5'-di-C-methyladenosine 3',5'-cyclicphosphate, 1,N⁶-α-phenyletheno-2'-O-acetyl-8-benzylthio-5',5'-di-C-methyladenosine 3',5'-cyclicphosphate, 1,N⁶-α-n-propyletheno-8-methylthioadenosine 3',5'-cyclicphosphate, 1,N⁶-α-n-propyletheno-8-phenylthioadenosine 3',5'-cyclicphosphate, 1,N⁶-α-n-propyletheno-8-p-fluorophenylthioadenosine 3',5'-cyclicphosphate, 1,N⁶-α-n-propyletheno-8-methylthio-9-(6-deoxy-α-L-talofuranosyl)-adenine 3',5'-cyclicphosphate, 1,N⁶-α-n-propyletheno-8-methylthio-9-(6-deoxy-β-D-allofuranosyl)-adenine 3',5'-cyclicphosphate, 1,N⁶-α-n-propyletheno-8-methylthio-5',5'-di-C-methyladenosine 3',5'-cyclicphosphate, 1,N⁶-α-phenyletheno-8-methylthioadenosine 3',5'-cyclicphosphate, 1,N⁶-α-phenyletheno-8-phenylthioadenosine 3',5'-cyclicphosphate, 1,N⁶-α-phenyletheno-8-p-fluorophenylthioadenosine 3',5'-cyclicphosphate, 1,N⁶-α-phenyletheno-8-methylthio-9-(6-deoxy-α-L-talofuranosyl)-adenine 3',5'-cyclicphosphate, 1,N⁶-α-phenyletheno-8-methylthio-9-(6-deoxy-β-D-allofuranosyl)adenine 3',5'-cyclicphsophate, and 1,N⁶-α-phenyletheno-8-methylthio-5',5'-di-C-methyladenosine 3',5'-cyclicphosphate.

EXAMPLE 31

A suspension of adenosine 3',5'-cyclicphosphate (329 mg., 1 mmole) and phenacylbromide (1 g., 5 mmole) in 0.5M sodium 2-morpholinoethanesulfonate buffer pH 5 (4 ml.) and dimethylformamide (6 ml.) is stirred at 50°C for 16 hours. A further quantity of phenacyl bromide (1 g.) is added and the mixture is stirred at 50°C for a further 24 hours. The reaction mixture is evaporated to dryness in vacuo, the residue is dissolved in water (50 ml.) and the pH adjusted to 7 by the addition of 2N sodium hydroxide solution. The aqueous solution is extracted with chloroform (3 × 20 ml.), diluted with 150 ml. of water and chromatographed on a DEAE sephadex column, as described in the procedure of Example 28, giving, after crystallization at pH 2, 1, N⁶-β-phenylethenoadenosine 3',5'-cyclicphosphate.

The product of this reaction is distinguished from the product of Example 7 by paper chromatography using i-propanol, ammonium hydroxide, water (7:1:2, v/v) or ethanol-1M-ammonium acetate pH 7.0 (5:2, v/v) as the developing solvents. Thus, the reaction of α-halo α-substituted aldehydes and α-halo ketones with adenine nucleotides gives different substituted 1-N⁶-etheno compounds.

EXAMPLE 31A

To a suspension of adenosine 3',5'-cyclicphosphate (329 mg., 1 mmole) in 50 percent aqueous ethanol is added diisopropylethylamine (0.19 ml., 1 mmole) and the mixture is shaken until a clear solution is obtained. The resulting solution is concentrated in vacuo and the residue is rendered anhydrous by repeated evaporation of pyridine.

The residue is dissolved in hexamethylphosphorictriamide, 2-morpholinoethanesulfonic acid (400 mg.) and bromomethyl phenyl ketone (400 mg., 2 mmole) are added. The mixture is shaken at room temperature (20°) for 6 days at which time water (1.00 ml.) is added and the pH of the solution is adjusted to 7 by the addition of dilute ammonium hydroxide solution. The aqueous solution is extracted with ether (2 × 30 ml.) and then chromatographed on a DEAE Sephadex column as described in the procedure of Example 28 giving after crystallization at pH 2, 1,N⁶-β-phenylethenoadenosine 3',5'-cyclicphosphate.

Alternatively, the product may be purified by chromatography on silica gel as follows:

At the end of the reaction period the reaction mixture is diluted with water (100 ml.) and the pH is adjusted to 2 by the addition of hydrochloric acid. The resultant precipitate is filtered off and dissolved in aqueous methanol by the addition of ammonium hydroxide solution. Silica gel (10 g.) is added and the mixture is concentrated in vacuo to give a dry power. This is suspended in 30 percent methanol in chloroform and added to the top of a silica gel column (90 g.) prepared in 30 percent methanol-chloroform. The column is eluted with a linear gradient of 30 percent methanol to 60 percent methanol in chloroform. The appropriate fractions are pooled, concentrated in vacuo and the residue crystallized from aqueous ethanol at pH 2 giving 1,N⁶-β-phenylethenoadenosine 3',5'-cyclicphosphate.

EXAMPLE 32

The procedures of Examples 31 or 31A are repeated using the compound product of Example 24 and the compounds listed in Column D (Example 25) above to prepare the corresponding 1,N⁶-β-substituted etheno products, to wit:

1,N⁶-β-n-propylethenoadenosine 3',5'-cyclicphosphate,

1,N⁶-β-methylethenoadenosine 3',5'-cyclicphosphate,

1,N⁶-β-ethylethenoadenosine 3',5'-cyclicphosphate,

1,N⁶-β-isopropylethenoadenosine 3',5'-cyclicphosphate,

1,N⁶β-n-butylethenoadenosine 3',5'-cyclicphosphate,

1,N⁶-β-t-butylethenoadenosine 3',5'-cyclicphosphate,

1,N⁶-β-pentylethenoadenosine 3',5'-cyclicphosphate,

1,N⁶-β-hexylethenoadenosine 3',5'-cyclicphosphate,

1,N⁶-β-heptylethenoadenosine 3',5'-cyclicphosphate,

1,N⁶-β-octylethenoadenosine 3',5'-cyclicphosphate,
1,N⁶-β-nonylethenoadenosine 3',5'-cyclicphosphate,
1,N⁶-β-decylethenoadenosine 3',5'-cyclicphosphate,
1,N⁶-β-p-methylphenylethenoadenosine 3',5'-cyclicphosphate,
1,N⁶-β-p-methoxyphenylethenoadenosine 3',5'-cyclicphosphate,
1,N⁶-β-p-chlorophenylethenoadenosine 3',5'-cyclicphosphate,
1,N⁶-β-naphth-2-ylethenoadenosine 3',5'-cyclicphosphate, Also prepared are 1,N⁶-β-biphenylethenoadenosine 3',5'-cyclicphosphate and 1,N⁶-β-(p-bromophenyl)ethenoadenosine 3',5'-cyclicphosphate.

EXAMPLE 33

The procedures of Example 32 are repeated to prepare the following 1,N⁶-β-substituted etheno products from the respective starting compounds, corresponding to the 1,N⁶-α-substituted etheno products of Example 30, to wit:

1,N⁶-β-n-propyletheno-8-bromoadenosine 3',5'-cyclicphosphate,
1,N⁶-β-n-propyletheno-8-benzylthioadenosine 3',5'-cyclicphosphate, the 3'-cyclic ester of 1, N⁶-β-n-propyletheno-5'-deoxy-5'-dihydroxyphosphinylmethyladenosine,
the 3'-cyclic ester of 1, N⁶-β-n-propyletheno-8-methylthio-5'-deoxy-5'-dihydroxyphosphinylmethyladenosine,
the 3'-cyclic ester of 1, N⁶-β-n-propyletheno-8-benzylthio-5'-deoxy-5'-dihydroxyphosphinylmethyladenosine,
the 5'-cyclic ester of 1, N⁶-β-n-propyletheno-3'-deoxy-3'dihydroxyphosphinylmethyladenosine,
the 5'-cyclic ester of 1, N⁶-β-n-propyletheno-8-methylthio-3'-deoxy-3'-dihydroxyphosphinylmethyladenosine,
the 5'-cyclic ester of 1, N⁶-β-n-propyletheno-8-benzylthio 3'-deoxy-3'-dihydroxyphosphinylmethyladenosine,
1, N⁶-β-n-propyletheno-9-(6-deoxy-β-D-allofuranosyl)-adenine 3',5'-cyclicphosphate,
1, N⁶-β-n-propyletheno-9-(6-deoxy-β-L-talofuranosyl)-adenine 3',5'-cyclicphosphate,
1, N⁶-β-n-propyletheno-8-benzylthio-9-(6-deoxy-β-D-allofuranosyl)-adenine 3',5'-cyclicphosphate,
1, N⁶-β-n-propyletheno-8-benzylthio-9-(6-deoxy-β-L-talofuranosyl)-adenine 3',5'-cyclicphosphate, 1, N⁶-β-n-propyletheno-5',5'-di-C-methyladenosine 3',5'-cyclicphosphate,
1, N⁶-β-n-propyletheno-8-benzylthio-5',5'-di-C-methyladenosine 3',5'-cyclicphosphate,
1, N⁶-β-phenyletheno-8-benzylthioadenosine 3',5'-cyclicphosphate, the 3'-cyclic ester of 1, N⁶-β-phenyletheno-5'-deoxy-5'-dihydroxyphosphinylmethyladenosine,
the 3'-cyclic ester of 1, N⁶-β-phenyletheno-8-methylthio-5'-deoxy-5'-dihydroxyphosphinylmethyladenosine,
the 3'-cyclic ester of 1, N⁶-β-phenyletheno-8-benzylthio-5'-deoxy-5'-dihydroxyphosphinylmethyladenosine,
the 5'-cyclic ester of 1, N⁶-β-phenyletheno-3'-deoxy-3'-dihydroxyphosphinylmethyladenosine,
the 5'-cyclic ester of 1, N⁶-β-phenyletheno-8-methylthio-3'-deoxy-3'-dihydroxyphosphinylmethyladenosine,
the 5'-cyclic ester of 1, N⁶-β-phenyletheno-8-benzylthio-3'-deoxy-3'-dihydroxyphosphinylmethyladenosine,
1, N⁶-β-phenyletheno-9-(6-deoxy-β-D-allofuranosyl)-adenine 3',5'-cyclicphosphate,
1, N⁶β-phenyletheno-9-(6-deoxy-β-L-talofuranosyl)-adenine 3',5'-cyclicphosphate,
1, N⁶-β-phenyletheno-8-benzylthio-9-(6-deoxy-β-D-allofuranosyl)-adenine 3',5'-cyclicphosphate,
1, N⁶-β-phenyletheno-8-benzylthio-9-(6-deoxy-α-L-talofuranosyl) adenine 3',5'-cyclicphosphate,
1, N⁶-β-phenyletheno-5',5'-di-C-methyladenosine 3',5'-cyclicphosphate,
1, N⁶-β-phenyletheno-8-benzylthio-5',5'-di-C-methyladenosine 3',5'-cyclicphosphate,
1,N⁶-β-n-propyletheno-8-methylthioadenosine 3', 5'-cyclicphosphate,
1,N⁶-β-n-propyletheno-8-phenylthioadenosine 3',5'-cyclicphosphate,
1,N⁶-β-n-propyletheno-8-p-fluorophenylthioadenosine, 3',5'-cyclicphosphate,
1,N⁶-β-n-propyletheno-8-methylthio-9-(6-deoxy-α-L-talofuranosyl)-adenine 3',5'-cyclicphosphate,
1,N⁶-β-n-propyletheno-8-methylthio-9-(6-deoxy-β-D-allofuranosyl)-adenine 3',5'-cyclicphosphate,
1,N⁶-β-n-propyletheno-8-methylthio-5',5'-di-C-methyladenosine 3',5'-cyclicphosphate,
1,N⁶-β-phenyletheno-8-methylthioadenosine 3',5'-cyclicphosphate,
1,N⁶-β-phenyletheno-8-phenylthioadenosine 3',5'-cyclicphosphate,
1,N⁶-β-phenyletheno-8-p-fluorophenylthioadenosine 3',5'-cyclicphosphate,
1,N⁶-β-phenyletheno-8-methylthio-9-(6-deoxy-α-L-talofuranosyl)-adenine 3',5'-cyclicphosphate,
1,N⁶-β-phenyletheno-8-methylthio-9-(6-deoxy-β-D-allofuranosyl) adenine 3',5'-cyclicphosphate, and
1,N⁶-β-phenyletheno-8-methylthio-5',5'-di-C-methyladenosine 3',5'-cyclicphosphate, and so forth.

Alternatively, the 2'-O-acyl compounds are prepared by introducing the 2'-O-acyl grouping, in accordance with the procedures of Example 19, after the introduction of the 1,N⁶-etheno or -substituted etheno grouping, as described in Examples 26, 28, and 31.

What is claimed is:

1. A compound selected from those represented by the following formula:

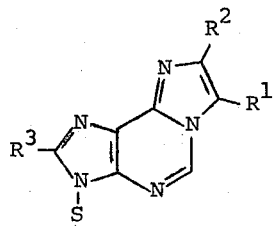

wherein one of R¹ and R² is hydrogen and the other of R¹ and R² is hydrogen, alkyl of from 1 to 10 carbon atoms, phenyl, substituted phenyl, or 2-naphthyl;

R³ is hydrogen, halo, hydroxy, alkoxy, aryloxy, aralkoxy, sulfhydryl, alkylthio, arylthio, aralkylthio, azido, amino, acylamino, alkylamino, aralkylamino, dialkylamino, or diaralkylamino in which each alkyl radical contains 1 to 18 carbon atoms, each acyl radical contains 1 to 22 carbon atoms and each aralkyl radical contains 7 to 20 carbon atoms;

S is a sugar moiety selected from the group consisting of:

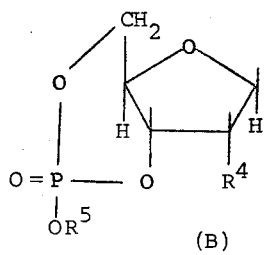
(B)

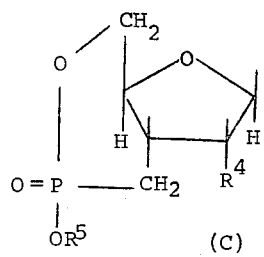
(C)

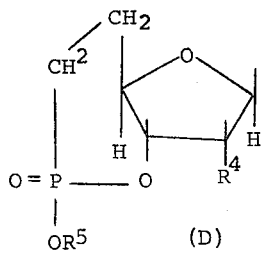
(D)

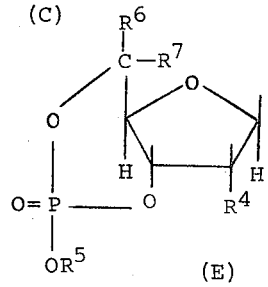
(E)

wherein, in each applicable formula, $R^4$ is hydroxy an acyloxy radical having from 1 to 22 carbon atoms tetrahydropyran-2-yloxy, tetrahydrofuran-2-yloxy or 4-(lower)-alkoxytetrahydropyran-4-yloxy;

$R^5$ is hydrogen or a pharmaceutically acceptable cation; and one of $R^6$ or $R^7$ is hydrogen and the other is a lower alkyl group or $R^6$ and $R^7$ are identical lower alkyl groups.

2. A compound according to claim 1 wherein each of $R^1$ and $R^2$ is hydrogen.

3. A compound according to claim 1 wherein $R^1$ is n-propyl and $R^2$ is hydrogen.

4. A compound according to claim 1 wherein $R^1$ is phenyl and $R^2$ is hydrogen.

5. A compound according to claim 1 wherein $R^1$ is hydrogen and $R^2$ is n-propyl or phenyl.

6. A compound according to claim 1 wherein $R^3$ is hydrogen or benzylthio, S is a sugar moiety of Formula (B) in which $R^4$ is hydroxy and $R^5$ is hydrogen.

7. A compound according to claim 1 wherein $R^3$ is methylthio, S is a sugar moiety of Formula (B) in which $R^4$ is hydroxy and $R^5$ is hydrogen.

8. A compound according to claim 7 wherein each of $R^1$ and $R^2$ is hydrogen.

9. A compound according to claim 7 wherein $R^1$ is n-propyl and $R^2$ is hydrogen.

10. A compound according to claim 6 wherein $R^1$ is n-propyl or hydrogen and $R^2$ is hydrogen.

11. A compound according to claim 7 wherein $R^1$ is phenyl and $R^2$ is hydrogen.

12. A compound according to claim 1 wherein S is a sugar moiety of Formula (C) wherein $R^4$ is hydroxy and $R^5$ is hydrogen.

13. A compound according to claim 12 wherein each of $R^2$ and $R^3$ is hydrogen and $R^1$ is n-propyl.

14. A compound according to claim 1 wherein S is a sugar moiety of Formula (D) wherein $R^4$ is hydroxy and $R^5$ is hydrogen.

15. A compound according to claim 14 wherein each of $R^2$ and $R^3$ is hydrogen and $R^1$ is n-propyl.

16. A compound according to claim 1 wherein S is a sugar moiety of Formula (E).

17. A compound according to claim 16 wherein $R^3$ is methylthio.

18. A compound according to claim 16 wherein $R^3$ is hydrogen, $R^4$ is hydroxy, and $R^5$ is hydrogen.

19. A compound according to claim 18 wherein $R^1$ is n-propyl, $R^2$ is hydrogen, $R^6$ is methyl, and $R^7$ is hydrogen.

20. A compound according to claim 18 wherein $R^1$ is n-propyl, $R^2$ is hydrogen, $R^6$ is hydrogen and $R^7$ is methyl.

21. A compound according to claim 18 wherein $R^1$ is n-propyl, $R^2$ is hydrogen and each of $R^6$ and $R^7$ is methyl.

* * * * *

UNITED STATES PATENT AND TRADEMARK OFFICE
CERTIFICATE OF CORRECTION

PATENT NO. : 3,872,098
DATED : March 18, 1975
INVENTOR(S) : Gordon H. Jones et al.

It is certified that error appears in the above-identified patent and that said Letters Patent are hereby corrected as shown below:

Column 4, line 4, "adencsine" should read -- adenosine --.

Column 12, line 2, "isopropyladehosing" should read --isopropyladenosine --. Column 12, line 49, "9-(6-deoxy-β-L-talofuranosyl)-" should read -- 9-(6-deoxy-α-L-talofuranosyl)- --.
Column 12, lines 51 and 52, "3',5'-cyclicphosphate, the 3'-cyclic ester" should read -- 3',5'-cyclicphosphate, 8-methylthioadenosine 3',5'-cyclicphosphate, the 3'-cyclic ester--
Column 12, lines 60 and 61, "9-(6-deoxy β-L-talofuranosyl)-" should read -- 9-(6-deoxy-α-L-talofuranosyl)- --.
Column 13, line 20, "bensylamine" should read --benzylamine --.
Column 13, line 66, "methoxyadenoxine" should read -- methoxyadenosine --. Column 14, line 32, "9-(6-deoxy-β-L-talofuranosyl)-" should read -- 9-(6-deoxy-α-L-talofuranosyl)- --.
Column 15, line 37, "(Na$^-$)" should read -- (Na$^+$) --.

Column 18, line 36, "1, N$^6$-etheno-9-(6-deoxy-α-D-allofuranosyl)-" should read -- 1, N$^6$-etheno-9-(6-deoxy-β-D-allofuranosyl)- --.
Column 18, line 40, "N$^6$-etheno-9-(2-O-benzoyl-6-deoxy-α-D-" should read -- N$^6$-etheno-9-(2-O-benzoyl-6-deoxy-β-D- --.
Column 18, line 44, "N$^6$-ethene-8-benzylthio-9-(6-deoxy-α-D-" should read -- N$^6$-etheno-8-benzylthio-9-(6-deoxy-β-D- --.
Column 19, line 3, "1,N$^6$-etheno-8-methylthio-9-(6-deoxy-α-D-" should read -- 1,N$^6$-etheno-8-methylthio-9-(6-deoxy-β-D- --.
Column 19, line 9, "1,N$^6$-etheno-8-ethylthio-9-(6-deoxy-α-D-" should read -- 1,N$^6$-etheno-8-ethylthio-9-(6-deoxy-β-D- --.
Column 23, line 46, "N$^6$-β-n-propyletheno-9-(6-deoxy-β-L-" should read -- N$^6$-β-n-propyletheno-9-(6-deoxy-α-L- --.
Column 23, line 50, "N$^6$-β-n-propyletheno-8-benzylthio-9-(6-deoxy-β-L-" should read -- N$^6$-β-n-propyletheno-8-benzylthio-9-(6-deoxy-α-L- --.
Column 24, line 9, "N$^6$-β-phenyletheno-9-(6-deoxy-β-L-" should read -- N$^6$-β-phenyl-etheno-9-(6-deoxy-α-L- --.

UNITED STATES PATENT AND TRADEMARK OFFICE
CERTIFICATE OF CORRECTION

PATENT NO. : 3,872,098
DATED : March 18, 1975
INVENTOR(S) : Gordon H. Jones et al.

It is certified that error appears in the above-identified patent and that said Letters Patent are hereby corrected as shown below:

Column 25, line 28, "$R^4$ is hydroxy an" should read -- $R^4$ is hydroxy, an --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*